US012431020B2

(12) United States Patent
Kobayashi et al.

(10) Patent No.: US 12,431,020 B2
(45) Date of Patent: Sep. 30, 2025

(54) BOARDING SUPPORT SYSTEM, BOARDING SUPPORT METHOD AND PROGRAM RECORDING MEDIUM

(71) Applicant: NEC Corporation, Tokyo (JP)

(72) Inventors: Kosei Kobayashi, Tokyo (JP); Tetsuro Hasegawa, Tokyo (JP); Hiroaki Aminaka, Tokyo (JP); Kei Yanagisawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 18/282,868

(22) PCT Filed: Mar. 22, 2021

(86) PCT No.: PCT/JP2021/011707
§ 371 (c)(1),
(2) Date: Sep. 19, 2023

(87) PCT Pub. No.: WO2022/201244
PCT Pub. Date: Sep. 29, 2022

(65) Prior Publication Data
US 2024/0169836 A1 May 23, 2024

(51) Int. Cl.
*G08G 1/123* (2006.01)
*G06Q 10/02* (2012.01)
(Continued)

(52) U.S. Cl.
CPC ............. *G08G 1/123* (2013.01); *G06Q 10/02* (2013.01); *G06V 20/52* (2022.01); *G06V 40/161* (2022.01); *G06V 2201/08* (2022.01)

(58) Field of Classification Search
CPC ........ G08G 1/123; G06Q 10/02; G06V 20/52; G06V 40/161; G06V 2201/08
See application file for complete search history.

(56) References Cited

U.S. PATENT DOCUMENTS 10,134,286 B1 * 11/2018 Elswick ............... G06Q 10/02
2018/0075754 A1 * 3/2018 Salter ................... H04W 4/023
(Continued)

FOREIGN PATENT DOCUMENTS

JP    2002-032897 A    1/2002
JP    2003067890 A *   3/2003
(Continued)

OTHER PUBLICATIONS

International Search Report for PCT Application No. PCT/JP2021/011707, mailed on Jun. 1, 2021.

*Primary Examiner* — Mohamed Barakat
(74) *Attorney, Agent, or Firm* — Sughrue Mion, PLLC

(57) ABSTRACT

A boarding support system, comprises: reception part for receiving an information of a taxicab reserved by a user of the taxicab from a dispatch system executing dispatch of the taxicab; image acquiring part for acquiring an image based on the information of a taxicab, in which the taxicab running for picking up as a response to a reservation is captured from a fixed-point camera which is installed at a predetermined position on a road and capable of taking an image of a taxicab running for picking up the user; and display part for causing a predetermined display device to display an information for identifying the taxicab by using the taxicab image.

18 Claims, 13 Drawing Sheets

(51) Int. Cl.
    *G06V 20/52*          (2022.01)
    *G06V 40/16*          (2022.01)

(56) References Cited

U.S. PATENT DOCUMENTS

| | | | |
|---|---|---|---|
| 2020/0175633 A1* | 6/2020 | Fujimoto | G01C 21/3697 |
| 2020/0193734 A1 | 6/2020 | Kamata et al. | |
| 2021/0042670 A1* | 2/2021 | Hirose | G08G 1/00 |
| 2021/0264783 A1 | 8/2021 | Suzuki et al. | |
| 2021/0407150 A1* | 12/2021 | Czymontek | G06Q 10/06315 |
| 2022/0270489 A1* | 8/2022 | Kakuchi | G08G 1/205 |
| 2022/0301430 A1* | 9/2022 | Sudo | H04N 7/183 |

FOREIGN PATENT DOCUMENTS

| | | |
|---|---|---|
| JP | 2019-053751 A | 4/2019 |
| JP | 2019-067012 A | 4/2019 |
| JP | 2020-097850 A | 6/2020 |
| JP | 2021-026457 A | 2/2021 |
| WO | 2019/243860 A1 | 12/2019 |
| WO | 2020/145312 A1 | 7/2020 |

\* cited by examiner

PROSPECTED PICK-UP SITE

BOARDING SUPPORT SYSTEM, BOARDING SUPPORT METHOD AND PROGRAM RECORDING MEDIUM

This application is a National Stage Entry of PCT/JP2021/011707 filed on Mar. 22, 2021, the contents of all of which are incorporated herein by reference, in their entirety.

FIELD

The present invention relates to a boarding support system, a boarding support method and a program recording medium.

BACKGROUND

Patent Literature 1 discloses a dispatch system that may prevent in advance a trouble caused by users' forgetting of a dispatch request of a vehicle (taxicab) to a vehicle dispatch center. The same literature describes that a user transmits information of a current location of the user to an information terminal device on a dispatched vehicle via a vehicle monitoring system or directly. In addition, it is disclosed that the vehicle monitoring system transmits to a user a vehicle data, such as an appearance, a color of a vehicle to be dispatched and the like, an image data of a driver's face, etc., an audio data of a driver's voice, and a movie data, such as a view image captured from a travelling vehicle and the like. (see paragraph 0128)

Patent Literature 2 discloses a dispatch service method, in which a user may be easily provided with a taxicab dispatch service even under a geographically unfamiliar location and a taxicab driver may quickly and accurately recognize a detail call up site where a user is waiting so as to provide a reliable dispatch service.

Patent Literature 3 discloses a configuration comprising a server that transmits a dispatch information including a boarding site to both of a user and a vehicular terminal device. (see paragraph 0051) Patent Literature 4 discloses an automatic drive vehicle comprising an image analyzing part that analyzes images which are captured using a plurality of cameras and in which surrounding [views] of a dispatch site are captured so as to dynamically set a dispatch area R according to a surrounding road state of the dispatch site.

[Translation Note:
An original term "geisha(-chu)" is literally translated as "running for picking up a user", while the original meaning of the term refers to a state where a taxicab assigned to a user due to a reservation is running for picking up the user or waiting the user for picking up him. An original term "geisha-ich" is translated as "pick-up site (designated by the user)", and "geisha-jikan" is translated as "pick-up time (designated by the user)".

An original term "haisha" is literally translated as "dispatch", which refers to an allocation of a taxicab to a user who makes the reservation. Herein, a term "dispatched vehicle" refers to an a vehicle (taxicab) allocated to a user for picking up him.]

PTL 1: Tokkai JP2003-67890A
PTL 2: Tokkai JP 2002-32897A
PTL 3: Tokkai JP 2019-067012 A
PTL 4: Tokkai JP 2020-097850 A

SUMMARY

The following analysis is provided by the present inventors. When a user requests a taxicab company and the like to run for picking up him, there is a case where the user has a difficulty of identifying a taxicab reserved by him because of the presence of a plurality of taxicabs at the pick-up site. On this point, although Patent Literature 1 discloses that information on a taxicab is transmitted to a user, there is a case of being not identical with an image as viewed by the user of the taxicab, since a database of a vehicle monitoring system, a digital camera, a video camera, and a microphone mounted on a vehicle are used as an information source.

It is a purpose of the present invention to provide a boarding support system, a boarding support method and a program recording medium, which may make easy to identify a taxicab present at a pick-up site.

According to a first aspect, there is provided a boarding support system, that is capable of acquiring image from a fixed-point camera which is installed at a predetermined position on a road and capable of taking an image of a taxicab running for picking up a user; comprising reception means for receiving information on a taxicab reserved by a user of the taxicab from a dispatch system executing dispatch of the taxicab, image acquiring means for acquiring an image in which the taxicab running for picking up is captured from the fixed-point camera based on the information of the taxicab, and display means for causing a predetermined display device to display information for identifying the taxicab by using the image of the taxicab.

According to second aspect, there is provided a boarding support method, wherein a computer that is capable of acquiring image from a fixed-point camera which is installed at a predetermined position on a road and capable of taking an image of a taxicab running for picking up a user executes: receiving information on a taxicab reserved by a user of the taxicab from a dispatch system executing dispatch of the taxicab, acquiring an image in which the taxicab running for picking up is captured from the fixed-point camera based on the information of the taxicab, and causing a predetermined display device to display information for identifying the taxicab using the image of the taxicab. The method is connected to a specific machine as a computer capable of acquiring an image from a fixed-point camera which is installed at a predetermined position on a road and capable of taking an image of a taxicab running for picking up a user.

According to a third aspect, there is provided a computer program (referred to as "program") for realizing functions by the boarding support system. Herein, the program is input to a computer device from an input device or an external device via a communication interface, stored in a storage device, and drives a processor according to predetermined steps or processes. In addition, the program may display a process result including an intermediate state step by step via a display device, if necessary, or communicate with an external device via the communication interface. A computer device for this purpose, as an example, comprises a processor, a storage device, an input device, a communication interface and a display device, if necessary, which may be typically connected one another via a bus. Further, the program may be stored in a computer readable (non-transitory) storage medium. That is, the present invention may be realized as a computer program product.

According to the present invention, it is realized to make easy to identify a taxicab present at a pick-up site.

EXAMPLE EMBODIMENTS

Figure 1:
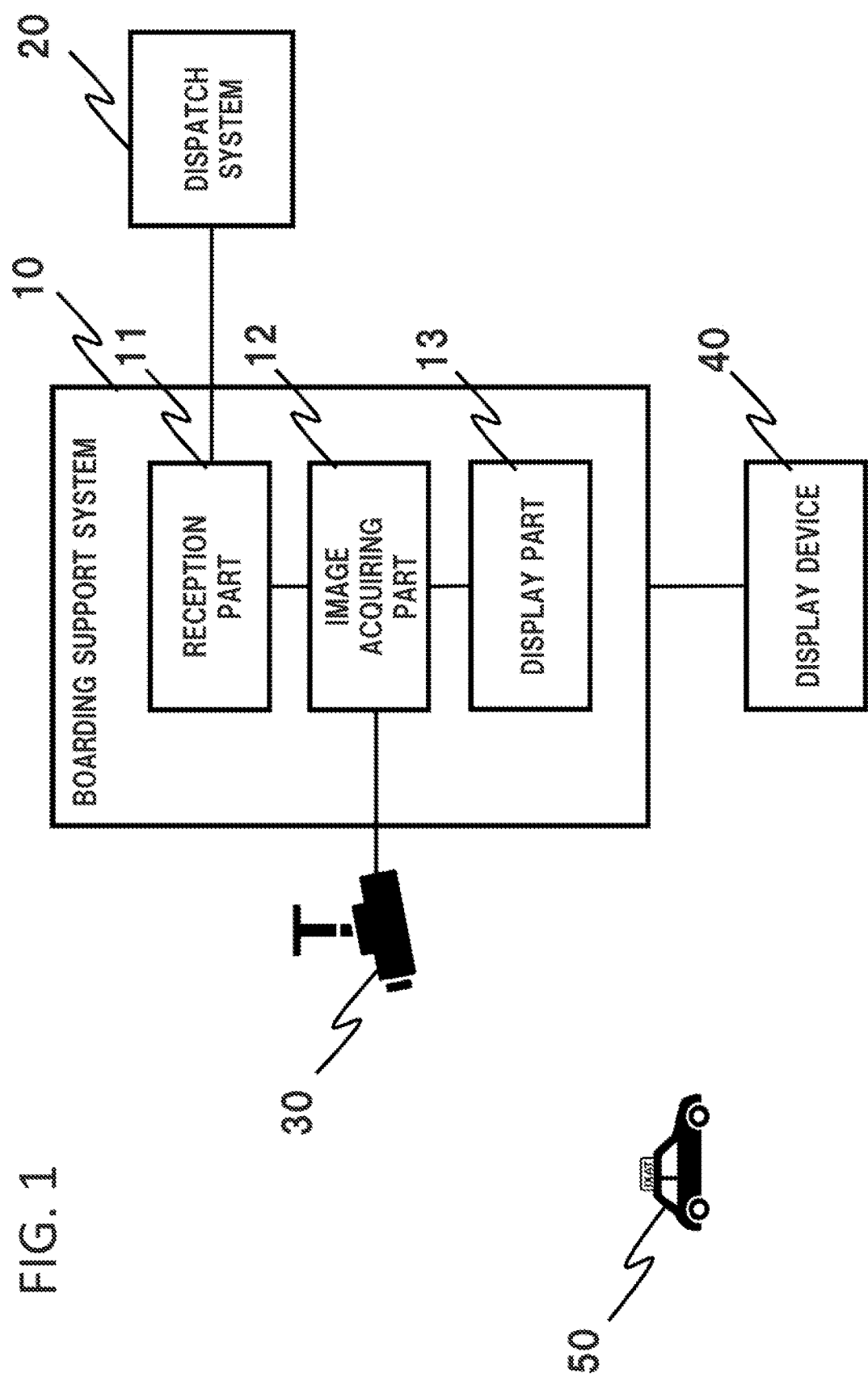
FIG. 1 is a diagram showing a configuration of one exemplary embodiment of the present invention.

First, an outline of an exemplary embodiment of the present invention is explained with reference to drawings. Herein, reference signs appended to the following exemplary embodiment are expediently appended to each element as one example for a purpose of easy understanding, thus are not intended to limit the present invention to an illustrated mode. In addition, connection lines between blocks in the drawings and the like, made reference in the following explanation, include both of bidirectional and one directional. One way arrow schematically indicates flow of main signal (data), thus does not exclude bidirectional. Further, input/output connection points in each block in the drawings comprise ports to interfaces, although being omitted in the drawings. A program is executed via a computer device, and the computer device comprises, for example, a processor, a storage device, an input device, a communication interface and a display device, if necessary. In addition, the computer device is configured in a manner capable of communicating with an internal equipment or an external equipment (including a computer) via the communication interface, irrespective of a cable communication or a radio communication.

In one exemplary embodiment, the present invention is realized by a boarding support system 10 connected to a fixed-point camera 30, a dispatch system (may be called as "car-allocation system, too) 20, a display device 40 as illustrated in FIG. 1.

The fixed-point camera 30 is installed at a predetermined position on a road and capable of taking an image of a taxicab running for picking up a user. As an installed position of the fixed-point camera 30, considered are an entrance of a main/principal [famous] facility, an intersection in front of the facility and the like, that are frequently designated as a pick-up site, but not particularly limited thereto.

The dispatch system 20 is a dispatch system of a taxicab company and an automatic drive vehicle and executes dispatch of a taxicab.

The display device 40 is a device which is to be a display destination of information for identifying the taxicab that is created by the boarding support system 10. As types of the display device 40, various types may be considered depending on devices configuring the boarding support system 10, such as a liquid crystal display of a user's smartphone, an eyeglasses-type information display device which is so-called as a smart glass, an information display board near the pick-up site, and the like.

The boarding support system 10 comprises a reception part 11, an image acquiring part 12 and a display part 13. The reception part 11 receives information on a taxicab reserved by a user of the taxicab from the dispatch system 20. The image acquiring part 12 acquires an image in which the taxicab running for picking up as a response to the reservation is captured from the fixed-point camera 30 based on the information on the taxicab. The display part 13 causes the display device 40 to display the information for identifying the taxicab using the image of the taxicab.

Herein, the following methods are considered as mechanisms of the image acquiring part 12 for acquiring, according to the information on the taxicab, the image of the taxicab associated to the information from the fixed-point camera 30. As a first method, a method may be used, in which the associated vehicle is detected by recognizing a number plate (license plate) included in the information on a taxicab with the fixed-point camera 30. As a second method, a method may be also used, in which a location information, etc., transmitted from a vehicular terminal device mounted on the taxicab is used. Under a case where a location and a time point of the vehicle on a road are collected by an operation center, etc., a method may be also adopted in which the operation center is queried to select a relevant fixed-point camera 30. In addition, a method for acquiring an image is not limited to a mode in which the image is directly received from the fixed-point camera 30, a mode may be also adopted, in which the image is acquired from a storage device which temporarily stores images captured by the fixed-point camera 30. The fixed-point camera 30 and the image acquiring part 12 may be mutually connected using a variety of networks. As one example, the fixed-point camera 30 and the image acquiring part 12 may be connected via a cable. As another example, the fixed-point camera 30 and the image acquiring part 12 may be connected through a radio communication, such as LTE, 5G, wireless LAN, and the like.

The boarding support system 10, which is configured as described above, receives information on a taxicab reserved by a user of the taxicab from the dispatch system 20. In addition, the boarding support system 10 acquires an image in which the taxicab running for picking up as a response to the reservation is captured from the fixed-point camera 30 based on the information on a taxicab. Further, the boarding support system 10 causes a terminal device of the user of the taxicab to display the information for identifying the taxicab using the image of the taxicab.

Figure 2:
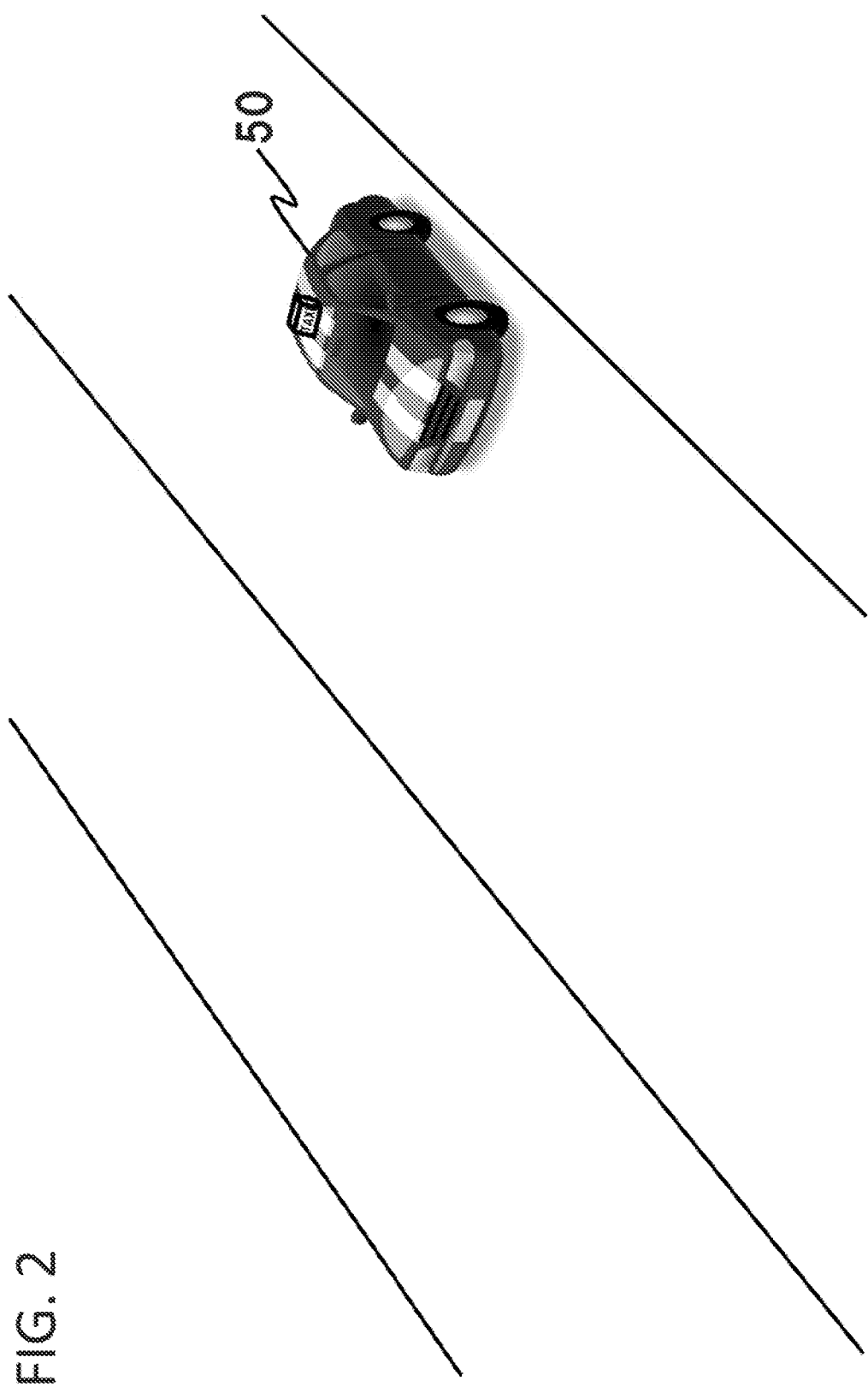
FIG. 2 is an explanatory view of one exemplary embodiment of the present invention.

As the information for identifying the taxicab, for example, an external appearance image of the taxicab may be used as illustrated in FIG. 2. In addition, as another mode of the information for identifying the taxicab, an image in which a driver's face of the taxicab running for picking up may be used. Further, the other mode of the information for identifying the taxicab, an information characteristic of a vehicle recognized from the image of the taxicab running for picking up may be used. Concrete examples of the information characteristic are explained in a second exemplary embodiment.

Accordingly, even under a case where a plurality of taxicabs are present at a pick-up site, a user of a taxicab may easily identify a taxicab which is reserved by him.

First Exemplary Embodiment

Figure 3:
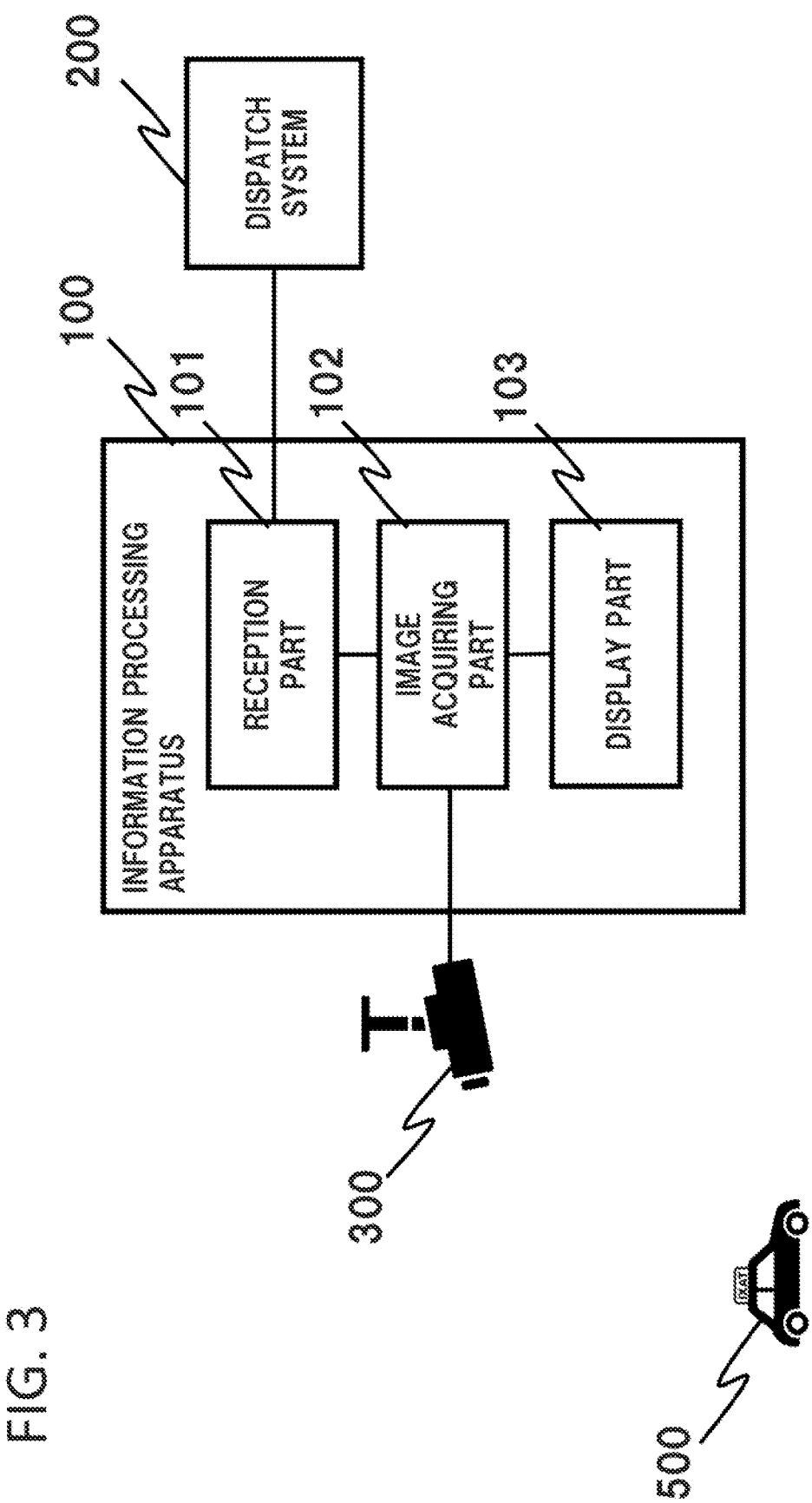
FIG. 3 is a diagram showing a system configuration of a first exemplary embodiment of the present invention.

Next, a first exemplary embodiment of the present invention is explained in detail with reference to the drawings. FIG. 3 is a diagram showing a system configuration of the first exemplary embodiment of the present invention. As illustrated in FIG. 3, an information processing apparatus 100 is indicated, which is connected to a fixed-point camera 300 which is installed at a predetermined position on a road and capable of taking an image of a taxicab 500 running for picking up a user, and a dispatch system 200.

The dispatch system 200 is a system that receives a reservation of a taxicab from a user of the taxicab (taxicab user), in which date/time, a pick-up site and the like are designated, and provides a dispatch instruction to a vehicular terminal device on the taxicab. In addition, the dispatch system 200 of the present exemplary embodiment has functions for transmitting information on a taxicab reserved by the taxicab user to information processing apparatus 100 of the taxicab user. Herein, there is an assumption that address information for transmitting information to the information processing apparatus 100 of the taxicab user (user ID, mail address, etc.) has been input from the user when the taxicab was reserved.

The information processing apparatus 100 comprises a reception part 101, an image acquiring part 102 and a display part 103. The reception part 101 receives information on a taxicab (taxicab information) reserved by a user of the taxicab from the dispatch system 200. The "taxicab information" is information with which a taxicab in an image captured by the fixed-point camera 300 may be identified. For example, a taxicab ID and number plate information may be used.

The image acquiring part 102 acquires an image in which the taxicab running for picking up as a response to the reservation is captured based on from the fixed-point camera 300 based on the taxicab information. For example, under a case where number plate information is used as the "taxicab information", the image acquiring part 102 cuts out a vehicular number plate area in the image captured by the fixed-point camera 300 and executes character recognition. In addition, the image acquiring part 102 collates a number plate received from the dispatch system 200 with a number plate which is subjected to the character recognition so that a taxicab reserved by a user of the taxicab may be determined. In addition, in a case where the side of the fixed-point camera 300 has a function to cut out a vehicular number plate area in an image, execute character recognition, and attach a tag to the image, identification of the taxicab reserved by a user of the taxicab may be also realized.

The display part 103 functions as a part for causing a display device (omitted in the drawings) of the information processing apparatus 100 to display information for identifying the taxicab using the taxicab image (taxicab image) acquired by the image acquiring part 102.

The information processing apparatus 100 so described above may be realized a smartphone and a variety of mobile devices which are carried by the taxicab user. Concretely, the information processing apparatus 100 may be configured by installing into these devices a computer program (so-called "application", "App") which realizes functions corresponding to the reception part 101, the image acquiring part 102 and the display part 103. As another model, the information processing apparatus 100 may be realized as a server that causes a smartphone and a variety of mobile device carried by the taxicab user to display the information for identifying the taxicab (see a fourth exemplary embodiment described later).

Figure 4:
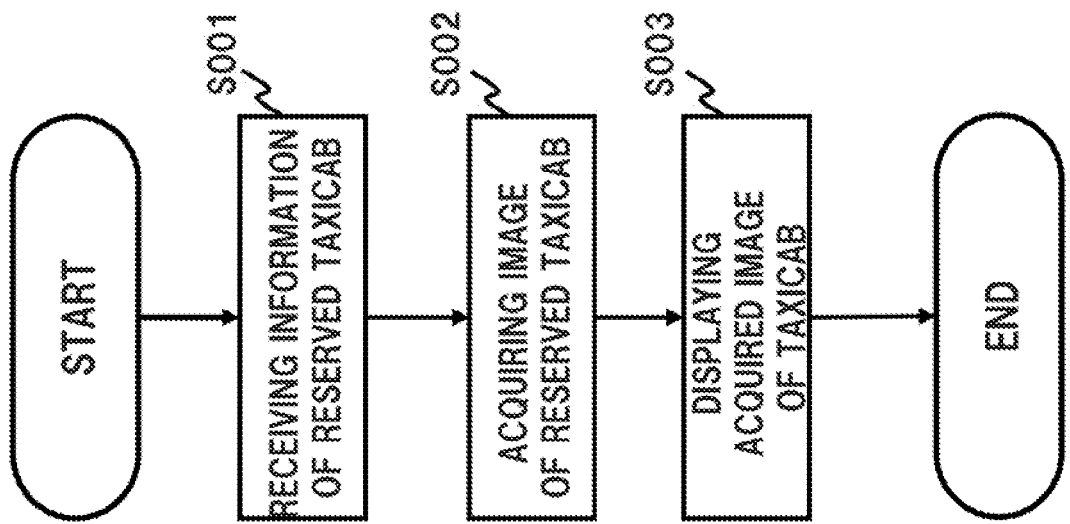
FIG. 4 is a flow diagram illustrating operations by an information processing apparatus of the first exemplary embodiment of the present invention.

Next, operations in the present exemplary embodiment are explained in detail with reference to the drawings. FIG. 4 is a flow diagram illustrating operations by the information processing apparatus 100 of the first exemplary embodiment of the present invention. As illustrated in FIG. 4, first, the information processing apparatus 100 receives the information (taxicab information) of the taxicab reserved by a user of the taxicab from the dispatch system 200 (Step S001).

The information processing apparatus 100 acquires the image in which the taxicab running for picking up as a response to the reservation is captured from the fixed-point camera 300 based on the taxicab information (Step S002).

The information processing apparatus 100 causes the display device (omitted in the drawings) of the information processing apparatus 100 to display the information for identifying the taxicab using the taxicab image acquired by the image acquiring part 102 (Step S003).

According to the information processing apparatus 100 executing operations as described above, a taxicab user may be provided with information (taxicab information) for identifying a taxicab on which he would board. For example, as illustrated in FIG. 2, an external appearance image of the taxicab is provided so that the taxicab user may certainly identify a taxicab on which he would board at a pick-up site using the external appearance image as a clue. In addition, under a case where an image capturing a driver's face of the taxicab running for picking up is used as the taxicab information, the identification becomes more easier.

Second Exemplary Embodiment

Next, a second exemplary embodiment is explained, which provides an information characteristic(s) (a body color, a logo illustrated on a vehicular body, a shape of a sign on a vehicular roof, presence/absence of sidelines and a color thereof, a vehicular type, number (written letters) on a number plate, etc.). Since the configurations and operations of the second exemplary embodiment is almost the same as those of the first exemplary embodiment, differences therebetween are mainly explained.

Figure 5:
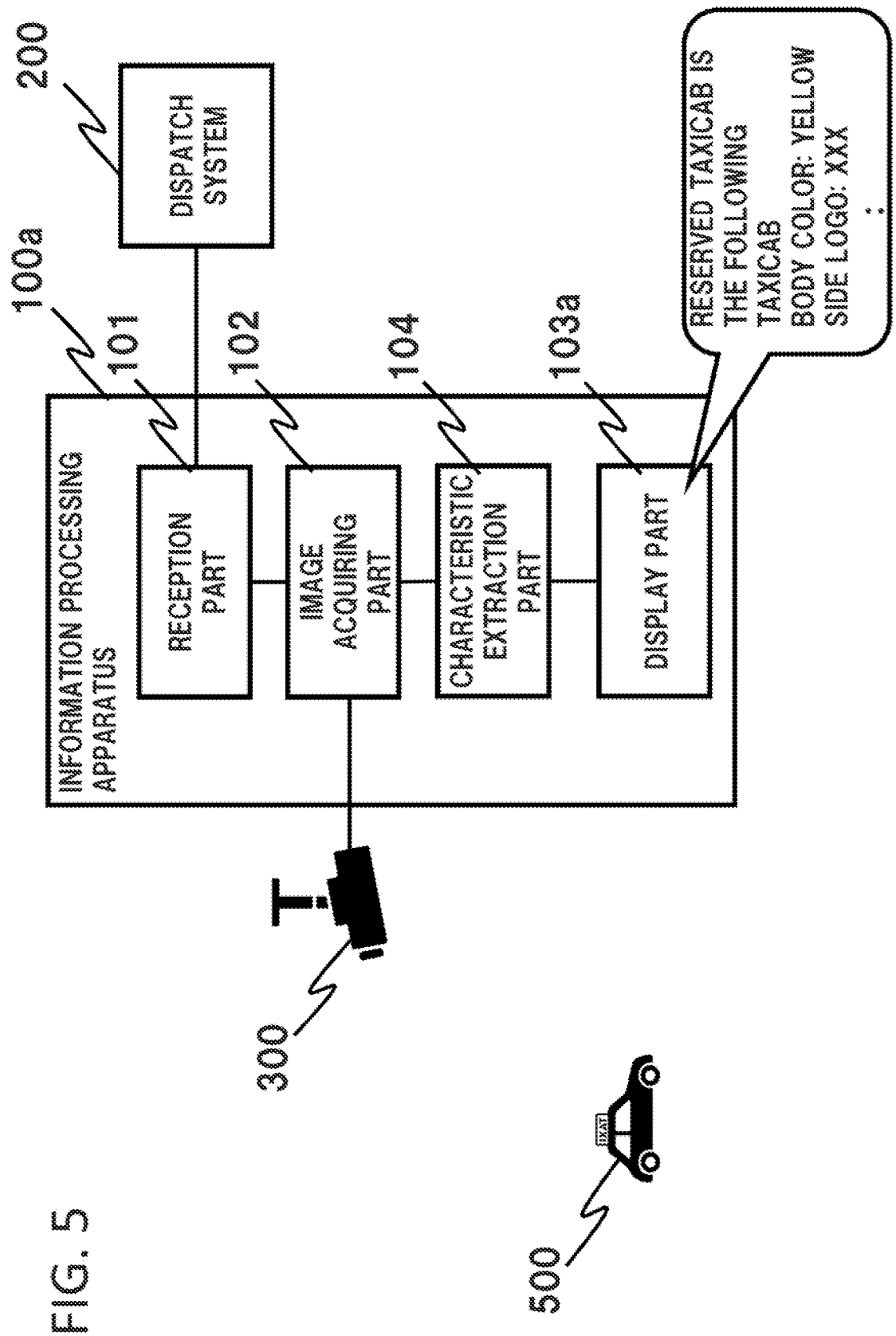
FIG. 5 is a diagram showing system configuration a second exemplary embodiment of the present invention.

FIG. 5 is a diagram showing a system configuration of the second exemplary embodiment of the present invention. There are differences from the first exemplary embodiment in points that a characteristic extraction part 104 is added to the information processing apparatus 100a and that the display part 103a is configured to display information characteristic(s) of a taxicab which is extracted by the characteristic extraction part 104.

In the present exemplary embodiment, a taxicab image acquired by the image acquiring part 102 is input to the characteristic extraction part 104. The characteristic extraction part 104 recognizes characteristic(s) of a taxicab from the taxicab image to output to the display part 103a. As a method for recognizing the characteristic(s) from the taxicab image, a method may be used in which a classifier created in advance by machine learning is used. For example, the characteristic extraction part 104 recognizes from the taxicab image at least one or more of a body color, a logo illustrated on a vehicular body, number plate information, a shape of a sign on a vehicular roof, presence/absence of sidelines and color thereof, a vehicular type etc.

The display part 103*a* causes the display device (omitted in the drawings) of the information processing apparatus 100*a* to display information characteristic(s) of the taxicab extracted by the characteristic extraction part 104. For example, as indicated in FIG. 5, the display device (omitted in the drawings) of the information processing apparatus 100 is caused to display the body color, a pattern of a side logo, etc. of the reserved taxicab.

Figure 6:
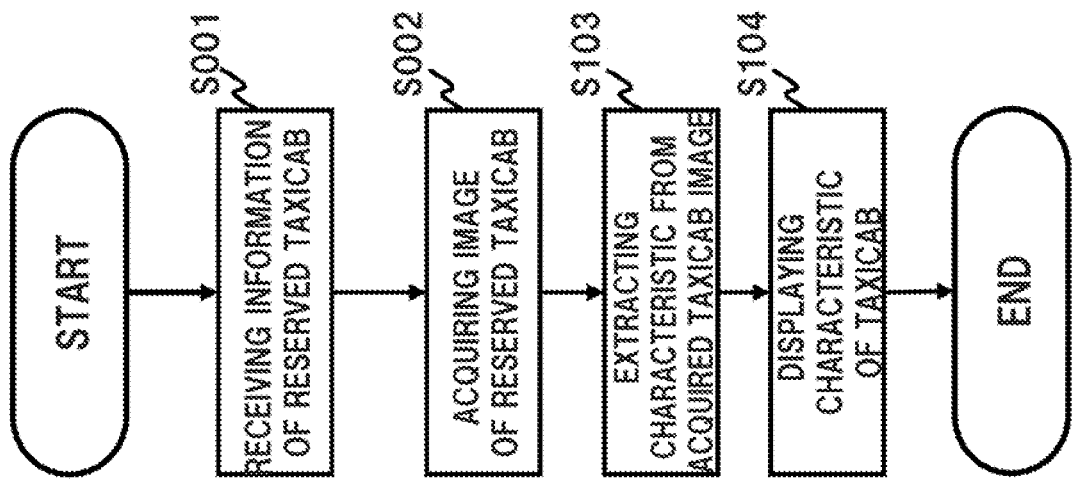
FIG. 6 is a flow diagram illustrating operations by an information processing apparatus of the second exemplary embodiment of the present invention.

Next, operations by the present exemplary embodiment are explained in detail with reference to the drawings. FIG. 6 is a flow diagram illustrating operations by the information processing apparatus 100*a* of the present exemplary embodiment. Operations in Steps S001, S002 in FIG. 6 is the same as those of the first exemplary embodiment, thus explanation thereof is omitted.

In Step S103, the information processing apparatus 100*a* extracts the characteristic(s) of the taxicab from the taxicab image.

In addition, in Step S104, the information processing apparatus 100*a* displays the characteristic(s) of the taxicab on the display device (omitted in the drawings).

As explained above, according to the present exemplary embodiment, the information characteristic(s) of a vehicle recognized from the taxicab image running for picking up a user is provided, thus the identification becomes more easier. Particularly, such provision of the information characteristic(s) would be a particularly useful information under a case where a body color and the like of taxicabs is designated by some countries (national governments), local governments or the like. Of course, like as the first exemplary embodiment, the taxicab image itself may be displayed together with the information characteristic(s).

Third Exemplary Embodiment

Next, a third exemplary embodiment is explained in detail with reference to the drawings, in which a pick-up site by the taxicab or an entering direction of the taxicab to the pick-up site is provided as the information for identifying the taxicab. Configurations and operations by the third exemplary embodiment are almost common as those of the first exemplary embodiment, thus differences therebetween are mainly explained.

Figure 7:
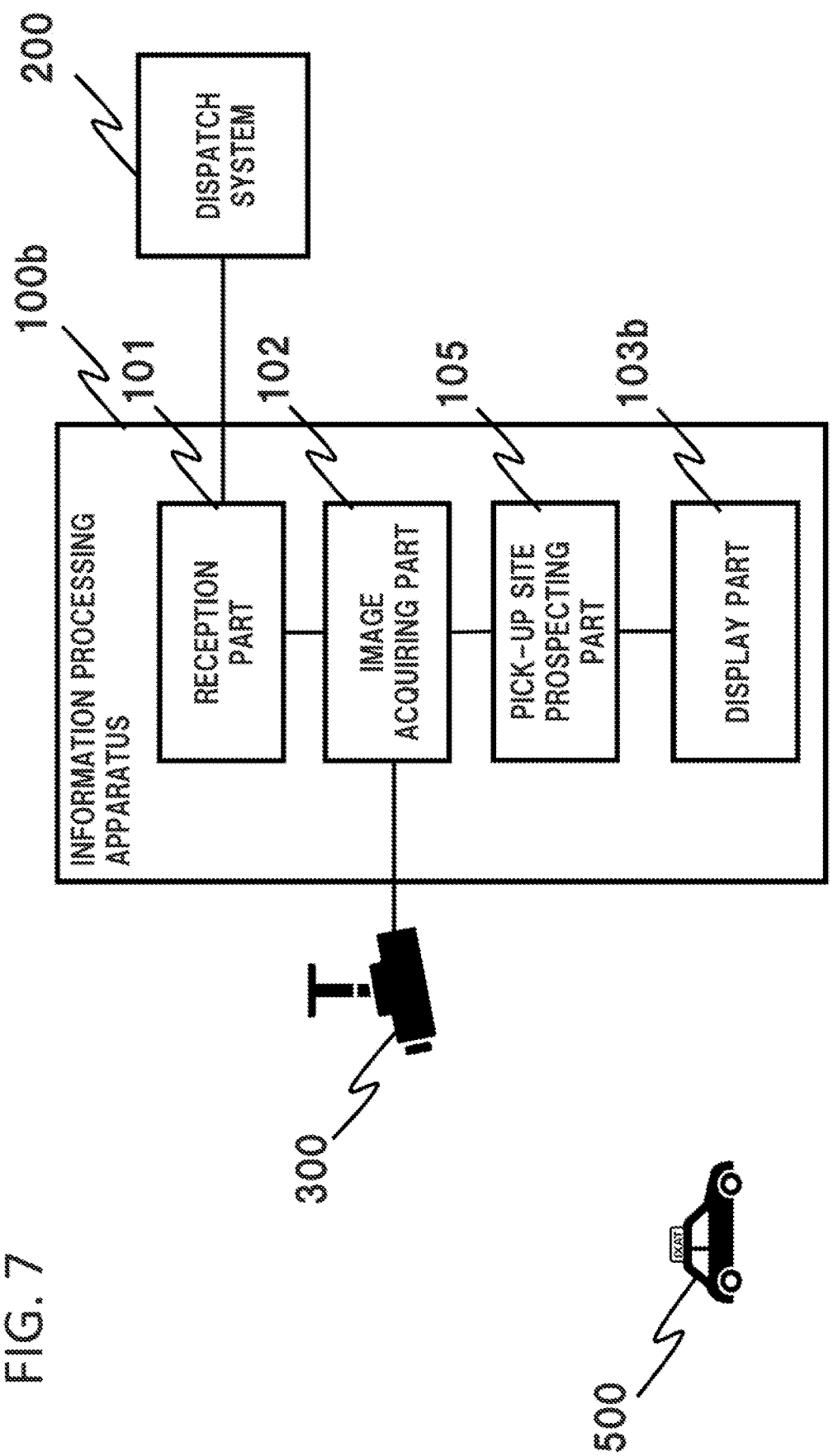
FIG. 7 is a diagram showing a system configuration of a third exemplary embodiment of the present invention.

FIG. 7 is a diagram showing a system configuration of the third exemplary embodiment of the present invention. There are differences from the first exemplary embodiment in points that a pick-up site prospecting part 105 is added to the information processing apparatus 100*b* and that the display part 103*b* is configured to display a pick-up site by the taxicab or an entering direction of the taxicab to the pick-up site prospected by the pick-up site prospecting part 105.

In the present exemplary embodiment, the taxicab image acquired by the image acquiring part 102 is input to the pick-up site prospecting part 105. The pick-up site prospecting part 105 recognizes an approach direction to the pick-up site or travelling speed of the taxicab from the taxicab image so as to prospect a pick-up site by the taxicab or an entering direction of the taxicab to the pick-up site. In addition, the pick-up site prospecting part 105 outputs the prospected pick-up site by the taxicab or the prospected entering direction of the taxicab to the pick-up site to the display part 103*b*. For example, if a passenger vehicle is approaching the pick-up location from the east using the main road, the pick-up location prediction unit 105 predicts a position at which the passenger vehicle is likely to stop, based on the surrounding traffic conditions and traffic rules, among the left-hand lanes along a running route. Concrete examples of the prospection by the pick-up site prospecting part 105 is explained in detail with reference to the drawings later.

The display part 103*b* causes the display device (omitted in the drawings) of the information processing apparatus 100*b* to display the prospected pick-up site by the taxicab or the prospected entering direction of the taxicab to the pick-up site which are prospected by the pick-up site prospecting part 105.

Figure 8:
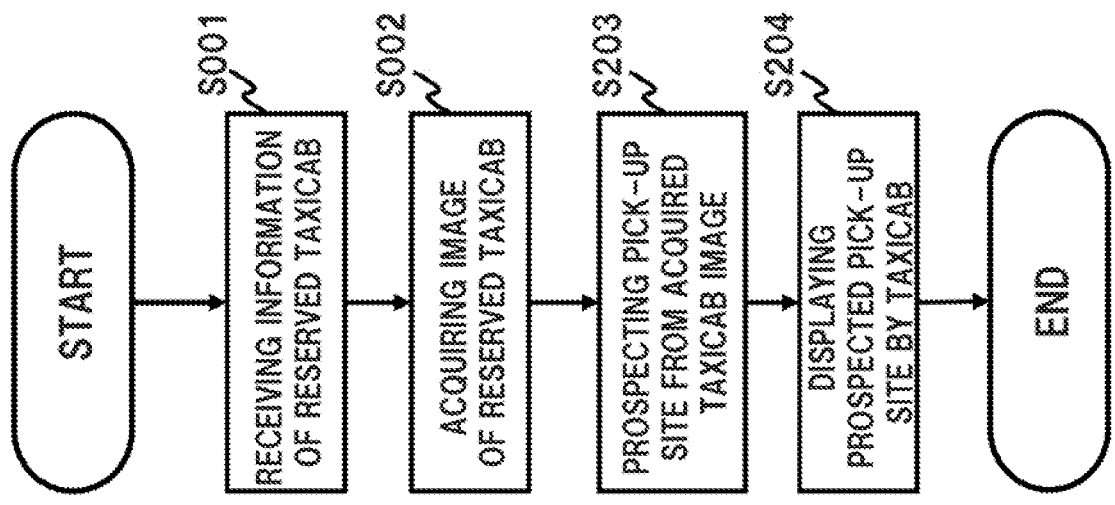
FIG. 8 is a flow diagram illustrating operations by an information processing apparatus of the third exemplary embodiment of the present invention.

Next, operations by the present exemplary embodiment are explained in detail with reference to the drawings. FIG. 8 is a flow diagram illustrating operations by the information processing apparatus 100*b* of the present exemplary embodiment. Operations in Steps S001, S002 in FIG. 8 is the same as those of the first exemplary embodiment, thus explanation thereof is omitted.

In Step S203, the information processing apparatus 100*b* prospects a pick-up site by the taxicab or an entering direction of the taxicab to the pick-up site from the taxicab image.

In addition, in Step S204, the information processing apparatus 100*b* displays the pick-up site by the taxicab or the entering direction of the taxicab to the pick-up site on the display device (omitted in the drawings).

Figure 9:
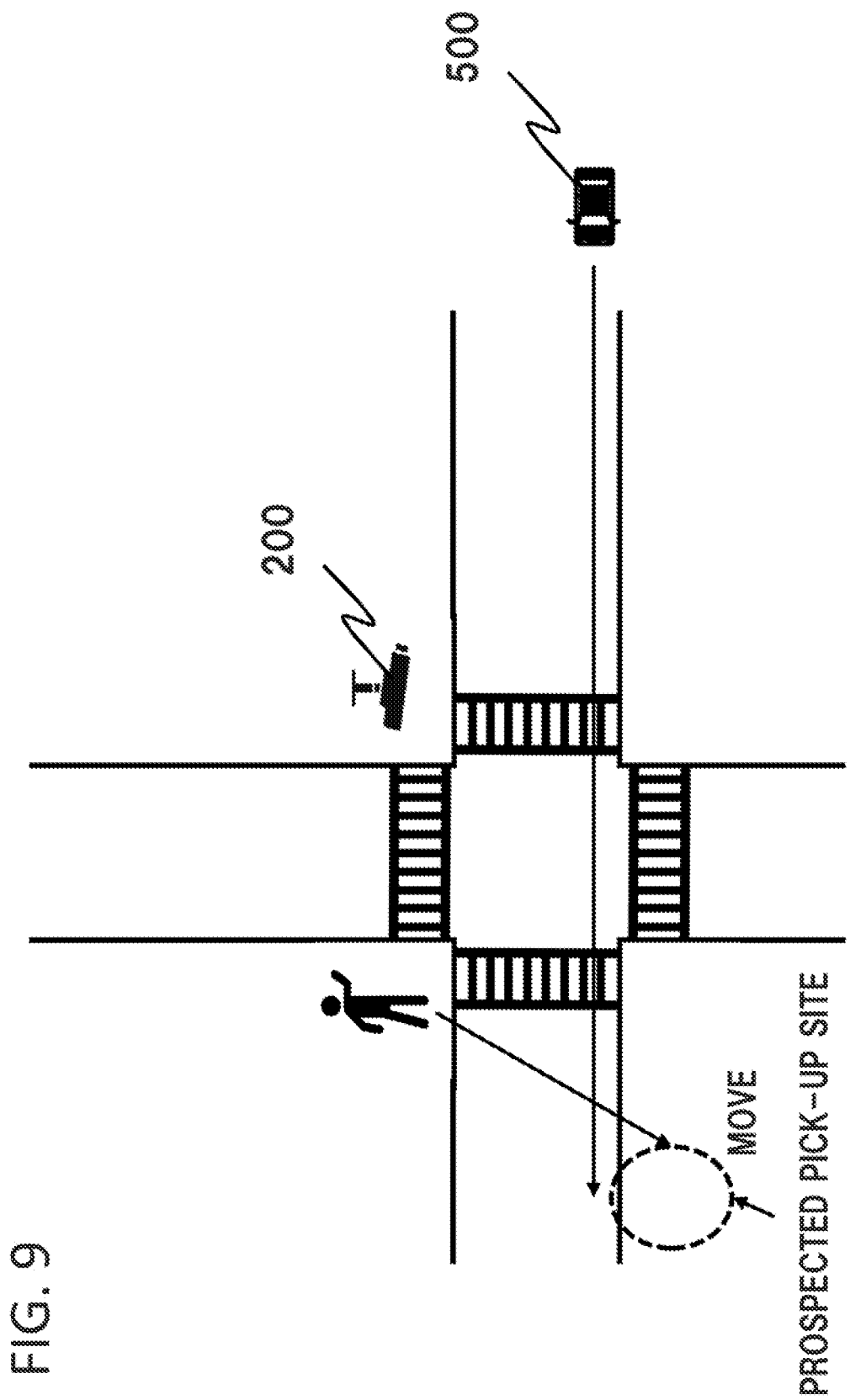
FIG. 9 is an explanatory view of the operations by the information processing apparatus of the third exemplary embodiment of the present invention.
Figure 10:
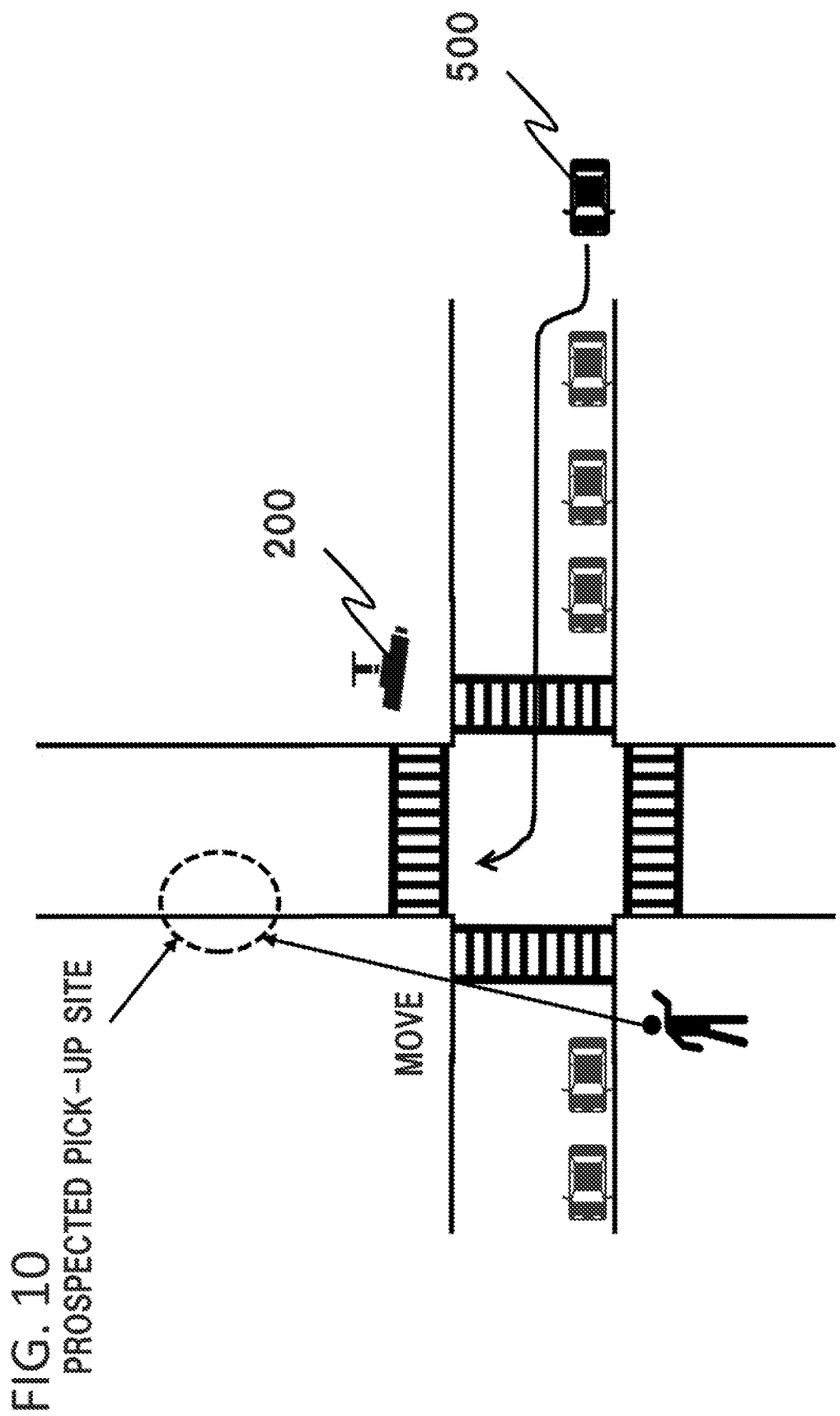
FIG. 10 is an explanatory view of operations by the information processing apparatus of the third exemplary embodiment of the present invention.
Figure 11:
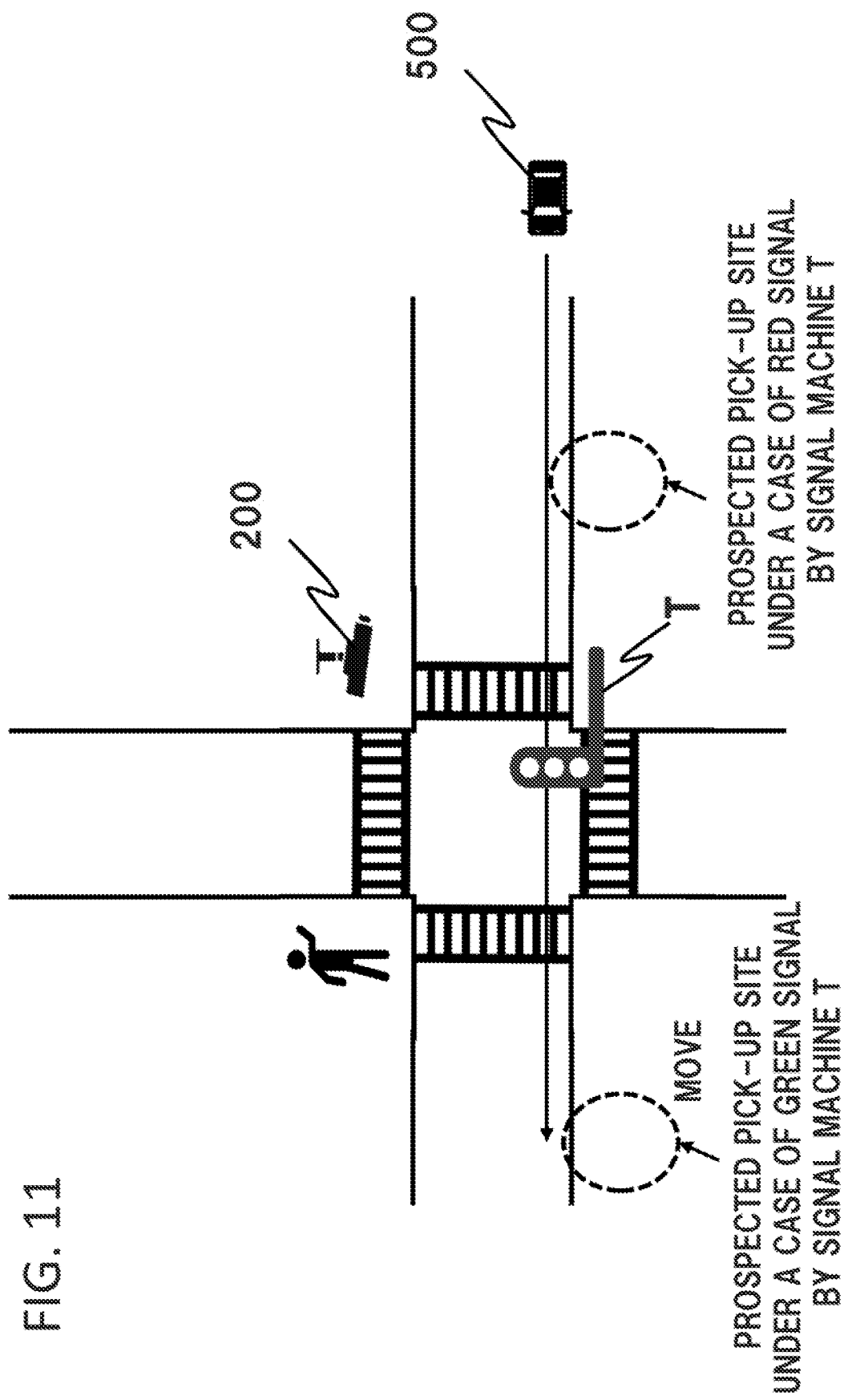
FIG. 11 is an explanatory view of a variation of operations by the information processing apparatus of the third exemplary embodiment of the present invention.

Operations by the information processing apparatus 100*b* is explained using FIG. 9 to FIG. 11. For example, as illustrated in FIG. 9, in a case where a taxicab 500 is approaching near an intersection as the pick-up site from east (right side in FIG. 9), the pick-up site prospecting part 105 prospects the pick-up site as follows. First, areas along a running route line from east to the intersection in FIG. 9 are selected, and then a site is determined among them, at which safety stop is possible and traffic rules and the like are not violated. In an example of FIG. 9, a site beyond the intersection and apart from the intersection at a predetermined distance is prospected as the pick-up site. It is because there is a possibility of obstructing traffic of left-turning vehicles and the like if stopped before the intersection, and parking/stopping is prohibited at an intersection and within 5 m from the side edge of intersection before or after thereof under Japanese traffic rules.

In addition, the pick-up site prospecting part 105 may prospect the pick-up site while considering traffic state near the intersection. For example, as illustrated in FIG. 10, under a case where a left lane near the intersection as the pick-up site is congested, the pick-up site prospecting part 105 prospects that the taxicab 500 would turn right and execute picking up at a road shoulder ahead.

In addition, the pick-up site prospecting part 105 may also prospect an arrival time to the pick-up site by the taxicab based on a location of a fixed-point camera 300 which took the taxicab image and the taxicab prospected from the image. In such case, the pick-up site prospecting part 105 is assumed to also function as the pick-up time prospecting part. In addition, the information processing apparatus 100*b* may also provide an arrival time to the prospected pick-up site by the taxicab together with the pick-up site by the taxicab or the entering direction of the taxicab to the pick-up site.

Further, in a case where the arrival time to the pick-up site by the taxicab is prospected, the pick-up site prospecting part 105 may also prospect the pick-up site while considering signaling timing at the intersection. For example, as illustrated in FIG. 11, if the taxicab 500 is possibly arriving at a timing of green signal of a traffic signal machine at the intersection as the pick-up site, the pick-up site prospecting part 105 would prospect a site beyond the intersection and apart from the intersection at a predetermined distance as the pick-up site likewise FIG. 9. On the other hand, if the taxicab 500 is possibly arriving at a timing of red signal of the traffic signal machine at the intersection as the pick-up site, the pick-up site prospecting part 105 would prospect a site before the intersection and apart from the intersection at a predetermined distance as the pick-up site.

Even under any cases of FIG. 9 to FIG. 11, the user of the taxicab 500 who is informed of the pick-up site or the entering direction may know actions of the taxicab 500 on which he intends to board and go to the pick-up site in advance so as to board more smoothly. In addition, in a more preferable mode, it is preferable that the information processing apparatus 100b informs the taxicab 500 of the prospected pick-up site, too. When a driver of the taxicab 500 stops it at a certainly prospected pick-up site, user's boarding becomes more easier.

As explained above, according to the present exemplary embodiment, by virtue of providing a user with a pick-up site and an entering direction of the taxicab running for picking up the user, identification thereof becomes more easier. Of course, the taxicab image and the information characteristic(s) may be also provided together with the pick-up site or the entering direction thereof likewise the first, second exemplary embodiments.

Herein, in the above described example, the explanation is made under an assumption that the pick-up site prospecting part 105 prospects a pick-up site by the taxicab or an entering direction of the taxicab to the pick-up site from the taxicab image. However, there is also a case where the pick-up site by the taxicab or the entering direction of the taxicab to the pick-up site may be definitively comprehended depending on the taxicab image. For example, in a case where the taxicab has arrived at the pick-up site, the pick-up site may be determined from a background image thereof. In such case, the information processing apparatus 100b may provide a map indicating a detail waiting site of the taxicab, instead of the prospected pick-up site.

Fourth Exemplary Embodiment

Figure 12:
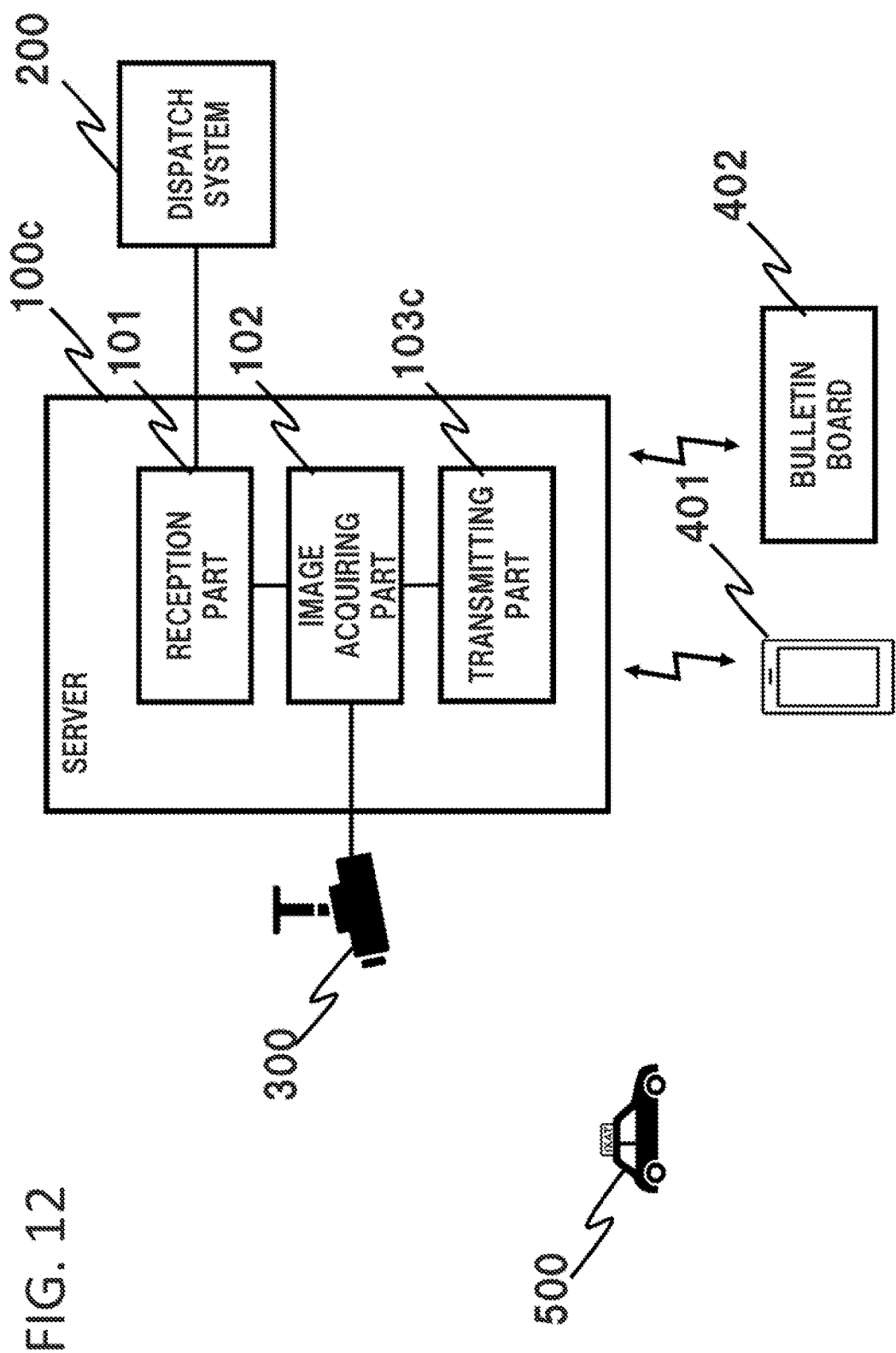
FIG. 12 is a diagram showing a system configuration of a fourth exemplary embodiment of the present invention.

Although the above described first to third exemplary embodiments are explained while referring examples in which the boarding support system is configured with the smartphone carried by the taxicab user, the boarding support system may be configured with a server that provides a service to these devices. FIG. 12 is a diagram showing a system configuration of a fourth exemplary embodiment of the present invention which is configured with a server 100c. The server 100c may be a server established on a cloud and a MEC (Multi-access Edge Computing) server.

FIG. 12 shows a server 100c connected to the fixed-point camera 300 and the dispatch system 200. The reception part 101 and the image acquiring part 102 of the server 100c are the same as those of the first exemplary embodiment, thus explanation thereof is omitted. The transmitting part 103c of the server 100c transmits the information for identifying the taxicab to a smartphone 401 carried by the taxicab user and a bulletin board 402.

The smartphone 401 carried by the taxicab user and the bulletin board 402 which have received the information for identifying the taxicab from the server 100c displays the information for identifying the taxicab. Accordingly, the server 100c comprises a display part for causing a predetermined display device to display the information for identifying the taxicab by using the taxicab image. Herein, in a case of using the bulletin board 402 as a display destination, information of the taxicab user and the information for identifying the taxicab may be displayed in combination.

According to the present exemplary embodiment, in addition to an effect equivalent to the first exemplary embodiment, there is an advantage that it is unnecessary to install a computer program (so called "application", "App") in a user's device in advance. Of course, the fourth exemplary embodiment may be modified to a configuration likewise the second, third exemplary embodiments, in which the information characteristic(s) of the taxicab and the pick-up site are provided as the information for identifying the taxicab.

As described above, each exemplary embodiment of the present invention has been explained. However, the present invention is not limited to the above described exemplary embodiments, thus further modifications, substitutions, adjustments may be added thereto within an ambit that they do not apart from a basic technical concept of the present invention. For example, apparatus configurations, configuration of each element, representation mode of data, etc., which are illustrated in each drawing, are an example to aid understanding of the present invention, thus not limited to those configurations illustrated in these drawings. For example, although the third exemplary embodiment is explained under an assumption that an intersection is determined as the pick-up site, the pick-up site is not limited to the intersection.

Figure 13:
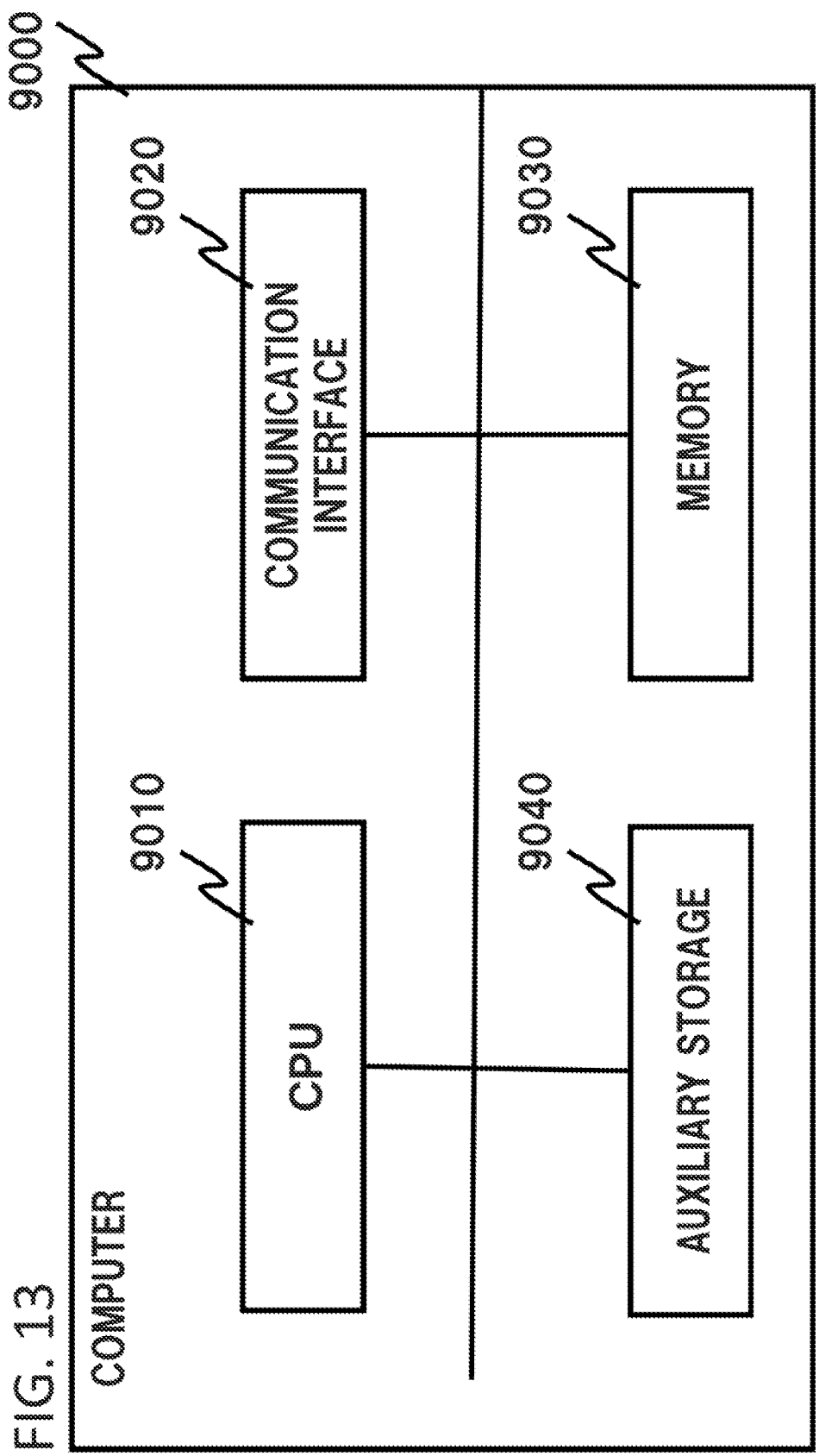
FIG. 13 is a diagram showing a configuration of a computer capable of functioning as a boarding support system of the present invention.

Further, the operations described in the above example embodiments may be realized by a program that allows a computer (9000 in FIG. 13) functioning as a boarding support system. Such computer is exemplified by a configuration in FIG. 13, that comprises a central processing unit (CPU) 9010, a communication interface 9020, a memory 9030, and an auxiliary storage 9040. That is, the CPU 9010 in FIG. 13 executes a taxicab identification program and a data transmission program.

That is, each part (processing mean and function) of the information processing apparatus and the server can be realized by a computer program that causes a processor in these apparatuses to perform each of the above processes using its hardware.

At the last, preferable modes of the present invention are summarized.

[First Mode]

(See the boarding support system according to the first aspect.)

[Second Mode]

A configuration may be adopted, in which the external appearance image of the taxicab running for picking up a user is displayed as the information for identifying the taxicab.

[Third Mode]

A configuration may be adopted, in which the boarding support system causes to display an image in which a driver's face of the taxicab running for picking up is captured as the information for identifying the taxicab.

[Fourth Mode]

A configuration may be adopted, in which the boarding support system causes to display an information characteristic of a vehicle recognized from an image of the taxicab running for picking up as the information for identifying the taxicab.

[Fifth Mode]

A configuration may be adopted, in which the boarding support system further comprises pick-up site prospecting means for prospecting a pick-up site by the taxicab or an entering direction of the taxicab to the pick-up site based on a location of the fixed-point camera and a travelling direction of the taxicab, in which as the information for identifying the taxicab, the pick-up site by the taxicab or the entering direction to the pick-up site is displayed.

[Sixth Mode]

A configuration may be adopted, in which the boarding support system further comprises pick-up time prospecting means for prospecting an arrival time of the taxicab based on a location of the fixed-point camera and an image of the taxicab, and the arrival time of the taxicab is displayed as the information for identifying the taxicab.

[Seventh Mode]

A configuration may be adopted, in which the boarding support system is configured by a server executing operations as a response to a request from a terminal device of the user of the taxicab.

[Eighth Mode]

(See the boarding support method according to the second aspect.)

[Ninth Mode]

(See the program according to the third aspect.) Herein, the eighth to ninth modes may be developed to second to seventh modes, likewise the first mode.

Herein, it is considered that each disclosure of the above Patent Literatures is incorporated herein by reference thereto, and the disclosures may be used as a base or a part of the present invention as necessary. Variations and adjustments of the example embodiments and examples are possible within the ambit of the entire disclosure (including the claims) of the present disclosure and based on the basic technical concept thereof. In addition, various combinations and selections (including non-selection) of various disclosed elements (including each element in each claim, each example embodiment, each drawing, etc.) are possible within the ambit of claims of the disclosure. Namely, the present disclosure of course includes various variations and modifications that could be made by those skilled in the art according to the overall disclosure including the claims and the technical concept. In particular, the numerical range described in the present application should be interpreted as specifically describing any numerical value or subrange that falls within that range, even if not explicitly stated. Further, each of the disclosed matters of the above cited literatures is regarded as included in the described matters in the present application, if required, on the basis of the concept of the present disclosure, as a part of the present disclosure, also that a part or entire thereof is used in combination with a described matter(s) in the present application.

REFERENCE SIGNS LIST 10 boarding support system
11 reception part
12 image acquiring part
13 display part
20, 200 dispatch system
30, 300 fixed-point camera
40 display device
50, 500 taxicab
100, 100a, 100b information processing apparatus
100c server
101 reception part
102 image acquiring part
103, 103a, 103b display part
103c transmitting part
104 characteristic extraction part
105 pick-up site prospecting part
401 smartphone
402 bulletin board
9000 computer
9010 CPU
9020 communication interface
9030 memory
9040 auxiliary storage

What is claimed is:

1. A boarding support system, comprising:
   at least a processor; and
   a memory in circuit communication with the processor;
   wherein the processor is configured to execute program instructions stored in the memory to:
   acquire an image from a fixed-point camera which is installed at a predetermined position on a road and configured to take the image of a taxicab which is reserved by a user and running for picking up the user;
   receive information on the taxicab from a dispatch system;
   acquire the image in which the taxicab is captured from the fixed-point camera based on the information received from the dispatch system;
   cause a terminal device carried by the user and a bulletin board to display information for identifying the taxicab by using the image received from the fixed-point camera;
   prospect a pick-up site by the taxicab or an entering direction of the taxicab to the pick-up site based on a location of the fixed-point camera and a travelling direction of the taxicab,
   wherein, as the information for identifying the taxicab, the pick-up site by the taxicab or the entering direction to the pick-up site is displayed.

2. The boarding support system according to claim 1, wherein the information for identifying the taxicab is an external appearance image of the taxicab.

3. The boarding support system according to claim 1, wherein the information for identifying the taxicab is an image in which a driver's face of the taxicab.

4. The boarding support system according to claim 1, wherein the information for identifying the taxicab is information characteristic of a vehicle recognized from the image of the taxicab.

5. The boarding support system according to claim 1, wherein the processor further executes determining a waiting site of the taxicab from a background image of the image received from the fixed-point camera, and
   causing the terminal device and the bulletin board to display a map indicating the waiting site of the taxicab.

6. The boarding support system according to claim 1, wherein the processor further executes prospecting an arrival time of the taxicab based on the location of the fixed-point camera and a time point at which the taxicab is captured by the fixed-point camera,
   wherein the arrival time of the taxicab is displayed as the information for identifying the taxicab.

7. The boarding support system according to claim 1, configured by a server executing operations as a response to a request from the terminal device.

8. A boarding support method, wherein
   a computer that is capable of acquiring image from a fixed-point camera which is installed at a predetermined position on a road and capable of taking an image of a taxicab which is reserved by a user and running for picking up the user executes:
  receiving information on the taxicab from a dispatch system;
  acquiring the image in which the taxicab is captured from the fixed-point camera based on the information received from the dispatch system;
  causing a terminal device carried by the user and a bulletin board to display information for identifying the taxicab using the image of the taxicab;
  prospecting a pick-up site by the taxicab or an entering direction of the taxicab to the pick-up site based on a location of the fixed-point camera and a travelling direction of the taxicab,
  wherein, as the information for identifying the taxicab, the pick-up site by the taxicab or the entering direction to the pick-up site is displayed.

9. The boarding support method according to claim 8, wherein the information for identifying the taxicab is an external appearance image of the taxicab.

10. The boarding support method according to claim 8, wherein the information for identifying the taxicab is an image in which a driver's face of the taxicab is captured.

11. The boarding support method according to claim 8, wherein the information for identifying the taxicab is information characteristic of a vehicle recognized from the image of the taxicab.

12. The boarding support method according to claim 8, wherein the computer further executes determining a waiting site of the taxicab from a background image of the image received from the fixed-point camera,
  wherein the computer causes the terminal device and the bulletin board to display a map indicating the waiting site of the taxicab.

13. The boarding support method according to claim 8, wherein the computer further executes prospecting an arrival time of the taxicab based on the location of the fixed-point camera and a time point at which the taxicab is captured by the fixed-point camera,
  wherein the arrival time of the taxicab is displayed as the information for identifying the taxicab.

14. The boarding support method according to claim 8, wherein the computer is configured by a server executing operations as a response to a request from the terminal device.

15. A non-transitory program recording medium, storing a program that causes a computer capable of acquiring an image from a fixed-point camera which is installed at a predetermined position on a road and capable of taking image of a taxicab which is reserved by a user and running for picking up the user to execute:
  a process of receiving information on the taxicab from a dispatch system;
  a process of acquiring the image in which the taxicab is captured from the fixed-point camera based on the information received from the dispatch system;
  a process of causing a terminal device carried by the user and a bulletin board display to display information for identifying the taxicab by using the image received from the fixed-point camera;
  a process of prospecting a pick-up site by the taxicab or an entering direction of the taxicab to the pick-up site based on a location of the fixed-point camera and a travelling direction of the taxicab,
  wherein, as the information for identifying the taxicab, the pick-up site by the taxicab or the entering direction to the pick-up site is displayed.

16. The non-transitory program recording medium according to claim 15, wherein the information for identifying the taxicab is an external appearance image of the taxicab.

17. The non-transitory program recording medium according to claim 15, wherein the information for identifying the taxicab is an image in which a driver's face of the taxicab is captured.

18. The non-transitory program recording medium according to claim 15, wherein the information for identifying the taxicab is information characteristic of a vehicle recognized from the image of the taxicab.

* * * * *